Patented Mar. 16, 1926.

1,576,503

UNITED STATES PATENT OFFICE.

CHARLES BOGIN, OF TERRE HAUTE, INDIANA, ASSIGNOR TO COMMERCIAL SOLVENTS CORPORATION, OF TERRE HAUTE, INDIANA, A CORPORATION OF MARYLAND.

POLYMERIZATION OF BUTYRALDEHYDE.

No Drawing. Application filed June 4, 1924. Serial No. 717,736.

*To all whom it may concern:*

Be it known that I, CHARLES BOGIN, a citizen of the United States, residing at Terre Haute, in the county of Vigo and the State of Indiana, have invented certain new and useful Improvements in Polymerization of Butyraldehyde, of which the following is a specification.

My invention relates particularly to the production of parabutyraldehyde from normal butyraldehyde by catalytic polymerization and condensation reactions.

It has been well known that the lower aliphatic aldehydes are easily polymerized by catalysts of acidic nature with the consequent formation of higher-boiling "metaaldehydes" and "para-aldehydes". For example, acetaldehyde, boiling at 21° C. may be readily polymerized by the action of an acidic catalyst such as concentrated sulfuric acid to form paraacetaldehyde boiling at 124° C. together with some metaacetaldehyde.

I have found that the polymerization of n-butyraldehyde presents certain complicating factors which interfere with the isolation of parabutyraldehyde in good yields. These difficulties seem to be inherent to the butyl group and may be described briefly as follows:—

When from one-half to two per cent of acidic catalyst is added to n-butyraldehyde at room temperature the temperature of the mixture rises rapidly to 80° C. or above and various polymerizations and condensations occur. About fifty per cent of the n-butyraldehyde will be found to have been unchanged by the reaction.

Some parabutyraldehyde will be found to be present as the result of a true polymerization, but the major portion of the reacted product will be found to be complex aldehydic bodies which are formed as the result of condensations of n-butyraldehyde with the elimination of water.

One object of my invention is to provide a suitable process for the production of pure parabutyraldehyde by catalytic polymerization of n-butyraldehyde in such a manner as to avoid the production of complex aldehydic bodies or other by-products. Another object of my invention is to provide a new and specially suitable catalyst for the polymerization.

I have found that acidic catalysts, such as the mineral acids or the anhydrous metallic salts of the mineral acids, are suitable catalysts for the polymerization.

I have discovered that within a certain range of reaction temperature, namely, 15°–50° C., it is possible to polymerize n-butyraldehyde to obtain an eighty-five to ninety per cent yield of parabutyraldehyde uncontaminated by by-products. If the temperature is allowed to rise above 50° C., condensation reactions occur in the presence of the catalyst with the formation of complex aldehydic bodies. If the temperature of the reaction is allowed to drop below 15° C., some metabutyraldehyde, soluble in the parabutyraldehyde, will form, and the product will be thus contaminated.

In conducting the polymerization it is necessary that only small quantities of catalyst, preferably from five tenths to two per cent, be employed as in the presence of larger quantities, the tendency of the n-butyraldehyde to condense can not be completely overcome—even at low temperatures.

When the polymerization is complete it is necessary that all traces of catalyst be removed from the material before distillation, for the parabutyraldehyde will decompose if distilled in the presence of traces of acid.

I have also discovered that anhydrous zinc chloride is particularly suitable to serve as a catalyst for the polymerization of n-butyraldehyde owing to its exceptional property of dissolving in the n-butyraldehyde and causing the polymerization without the generation of any heat. For that reason, careful temperature control of the reaction is not necessary when zinc chloride is used as the catalyst.

Now having generally described my invention I will give specific examples of its use.

*Example 1.*

To 1000 c.c. of n-butyraldehyde at room temperature was added 5 c.c. of concentrated sulfuric acid of specific gravity 1.84. The temperature of the reaction was maintained at 30° C. by artificial cooling and the reaction-mixture was allowed to stand for five hours. The mixture was then twice shaken with an equal volume of water in a separatory funnel to remove all traces of acid and the product was fractionally distilled to remove traces of water and the unchanged n-butyraldehyde.

An eighty-eight per cent yield of pure parabutyraldehyde, boiling at 129–130° under 35 mm. of vacuum, was obtained. The product is a colorless odorless liquid with a specific gravity of 0.917 at 21° C. It may be distilled in vacuum without decomposition, and at 210–220° C. under atmospheric pressure with some decomposition to the monomeric form. At the distillation temperature, in the presence of acid, it is readily decomposed to n-butyraldehyde.

*Example 2.*

To 1000 c.c. of n-butyraldehyde at room temperature was added 20 grams of anhydrous zinc chloride. The catalyst dissolved in the aldehyde without the generation of heat and the reaction-mixture was allowed to stand for four days. The mixture was then twice washed with water to remove the catalyst and was fractionally distilled. An eighty-five per cent yield of parabutyraldehyde was obtained, the fifteen per cent of unreacted aldehyde being recovered during the course of distillation.

Now having described my invention, I claim the following as new and novel:—

1. A process for the production of parabutyraldehyde consisting in adding an acidic catalyst to n-butyraldehyde and maintaining the temperature of the mixture between 15° C. and 50° C. until the reaction is complete.

2. A process for the production of parabutyraldehyde consisting in adding from five-tenths to two per cent of acidic catalyst to n-butyraldehyde and maintaining the temperature of the mixture between 15 and 50° C. until the reaction is complete.

3. A process for the production of parabutyraldehyde consisting in adding from five-tenths to two per cent of acidic catalyst to n-butyraldehyde, maintaining the temperature of the mixture between 15 and 50° C. until the reaction is complete, removing the catalyst from the reaction-mixture, and fractionally distilling the product to remove unreacted n-butyraldehyde.

4. A process for the production of parabutyraldehyde consisting in adding from five-tenths to two per cent of acidic catalyst to n-butyraldehyde, maintaining the temperature of the mixture between 15 and 50° C. until the reaction is complete, removing the catalyst from the reaction-mixture by washing, and fractionally distilling the product to remove unreacted n-butyraldehyde.

5. A process for the production of parabutyraldehyde consisting in adding from five-tenths to two per cent of anhydrous zinc chloride to butyraldehyde, allowing the reaction-mixture to stand until polymerization is complete, removing the zinc chloride by washing, and fractionally distilling the product to remove unreacted aldehyde.

Signed by me this 2nd day of June, 1924.

CHARLES BOGIN.